US012314410B2

(12) United States Patent
Xing et al.

(10) Patent No.: US 12,314,410 B2
(45) Date of Patent: May 27, 2025

(54) DATA CLUSTER MANAGEMENT

(71) Applicant: International Business Machines Corporation, Armonk, NY (US)

(72) Inventors: Chengxuan Xing, Winchester (GB); Alexander Robert Wood, Romsey (GB); Samuel S May, Portsmouth (GB); Doina Liliana Klinger, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 234 days.

(21) Appl. No.: 17/805,285

(22) Filed: Jun. 3, 2022

(65) Prior Publication Data
US 2023/0394163 A1 Dec. 7, 2023

(51) Int. Cl.
*G06F 21/62* (2013.01)
*G06F 16/28* (2019.01)
*G06F 21/60* (2013.01)
*G06F 9/38* (2018.01)

(52) U.S. Cl.
CPC ........ *G06F 21/6209* (2013.01); *G06F 16/285* (2019.01); *G06F 21/602* (2013.01); *G06F 9/3891* (2013.01)

(58) Field of Classification Search
CPC .. G06F 21/6209; G06F 21/602; G06F 9/3891; G06F 16/285; G06F 9/5072
See application file for complete search history.

(56) References Cited

U.S. PATENT DOCUMENTS

| 8,412,945 | B2 * | 4/2013 | Sweet | G06F 9/45558 |
| | | | | 713/168 |
| 9,536,070 | B2 | 1/2017 | Kling | |
| 10,021,143 | B2 | 7/2018 | Cabrera | |
| 10,601,807 | B2 * | 3/2020 | Sweet | G06F 21/577 |
| 11,126,670 | B2 * | 9/2021 | Pandey | G06F 16/951 |
| 11,573,816 | B1 * | 2/2023 | Featonby | H04L 67/10 |

(Continued)

FOREIGN PATENT DOCUMENTS

WO     2019233805 A1    12/2019

OTHER PUBLICATIONS

Mell, et al., "The NIST Definition of Cloud Computing," Recommendations of the National Institute of Standards and Technology, U.S. Department of Commerce, Special Publication 800-145, Sep. 2011, 7 pgs.

(Continued)

*Primary Examiner* — Theodore C Parsons
*Assistant Examiner* — James P Moles
(74) *Attorney, Agent, or Firm* — Jared C. Chaney

(57) ABSTRACT

A method for authorizing a pull request from a managed cluster may include generating an encrypted pull secret for a managed cluster, assigning the generated encrypted pull secret to the managed cluster, determining, responsive to receiving a pull request from a managed cluster at the service provider where the pull request has an accompanying encrypted pull secret, whether the pull request was initiated by an intended managed cluster by decrypting the encrypted pull secret assigned to the managed cluster using a decryption key, and authorizing the pull request based on whether the decrypted pull secret is assigned to an intended managed cluster.

16 Claims, 8 Drawing Sheets

(56) References Cited

U.S. PATENT DOCUMENTS

| | | | | |
|---|---|---|---|---|
| 2006/0059573 A1* | 3/2006 | Jung | .................. | H04L 63/10 |
| | | | | 726/31 |
| 2016/0173526 A1* | 6/2016 | Kasman | ............. | H04L 63/1458 |
| | | | | 726/23 |
| 2017/0006018 A1* | 1/2017 | Campagna | .............. | H04L 9/088 |
| 2017/0126412 A1* | 5/2017 | Camenisch | ............. | H04L 9/085 |
| 2018/0176023 A1* | 6/2018 | Prickett | ................ | H04L 9/0822 |
| 2019/0235861 A1* | 8/2019 | Suarez | ............... | G06F 9/45558 |
| 2020/0076794 A1* | 3/2020 | de Boer | ............... | H04L 9/3213 |
| 2020/0379746 A1* | 12/2020 | Shivashankara | ........ | G06F 21/45 |
| 2021/0097477 A1* | 4/2021 | Zhang | ................... | G01N 21/90 |
| 2021/0135869 A1* | 5/2021 | Barhudarian | ........... | G06F 21/62 |
| 2021/0311758 A1* | 10/2021 | Cao | .......................... | G06F 8/70 |
| 2021/0314310 A1* | 10/2021 | Cao | .................... | G06F 9/44505 |
| 2022/0019455 A1* | 1/2022 | Cao | .................... | G06F 21/6218 |

OTHER PUBLICATIONS

Van Der Ploeg, N., "How To Set Up a Private Docker Registry on Ubuntu 14.04." Published Oct. 15, 2014. 20 pages. Published by Digital Ocean. https://www.digitalocean.com/community/tutorials/how-to-set-up-a-private-docker-registry-on-ubuntu-14-04#step-four-%E2%80%94-secure-your-docker-registry-with-nginx.

* cited by examiner

DATA CLUSTER MANAGEMENT

BACKGROUND

The technical character of the present disclosure generally relates to the field of data cluster management, and more particularly, managing permissions for data clusters managed by a service provider.

When setting up a data plane cluster for a managed service, the service provider needs to inject a docker pull secret into the data plane Kubernetes cluster so that docker images can be pulled inside the data plane cluster.

A data plane cluster is a managed cluster that is owned by the customers of the service provider, and not by the service provider itself. It is a concern that if a user managed to get hold of the pull secret in the managed cluster, they may be able to use it to pull other images and use the pull secret in other clusters that they own.

This abusive usage of service provider owned pull secrets can cause security issues due to identity fraud and can also cause loss of revenue. There is therefore a need for managing the managed clusters, and in particular, the management of the pull secrets of the managed clusters.

SUMMARY

The present disclosure seeks to provide a method for authorizing a pull request from a managed cluster, which is managed by a service provider. Such methods may be computer-implemented. That is, such methods may be implemented in a computer infrastructure having computer executable code tangibly embodied on a computer readable storage medium having programming instructions configured to perform a proposed method. The present disclosure further seeks to provide a computer program product including computer program code for implementing the proposed concepts when executed on a processor. The present disclosure yet further seeks to provide a system for authorizing a pull request from a managed cluster, which is managed by a service provider.

According to an aspect of the present disclosure there is provided a method for authorizing a pull request from a managed cluster, which is managed by a service provider, the computer implemented method comprising: for each managed cluster managed by the service provider: generating an encrypted pull secret for a managed cluster; and assigning the generated encrypted pull secret to the managed cluster; and responsive to receiving a pull request from a managed cluster at the service provider, the pull request having an accompanying encrypted pull secret; determining whether the pull request was initiated by an intended managed cluster by decrypting the encrypted pull secret assigned to the managed cluster using a decryption key; and authorizing the pull request based on whether the decrypted pull secret is assigned to an intended managed cluster.

Embodiments may be employed in combination with conventional/existing service providers having one or more managed clusters belonging to users of the service. In this way, embodiments may integrate into legacy systems so as to improve and/or extend their functionality and capabilities. An improved data cluster management system may therefore be provided by proposed embodiments.

According to another embodiment of the present disclosure, there is provided a computer program product for authorizing a pull request from a managed cluster, which is managed by a service provider, the computer program product comprising a computer readable storage medium having program instructions embodied therewith, the program instructions executable by a processing unit to cause the processing unit to perform a method comprising: for each managed cluster managed by the service provider: generating an encrypted pull secret for a managed cluster; and assigning the generated encrypted pull secret to the managed cluster; and responsive to receiving a pull request from a managed cluster at the service provider, the pull request having an accompanying encrypted pull secret; determining whether the pull request was initiated by an intended managed cluster by decrypting the encrypted pull secret assigned to the managed cluster using a decryption key; and authorizing the pull request based on whether the decrypted pull secret is assigned to an intended managed cluster.

According to yet another aspect, there is provided a processing system comprising at least one processor and the computer program product according to one or more embodiments, wherein the at least one processor is adapted to execute the computer program code of said computer program product.

According to another aspect, there is provided a system for authorizing a pull request from a managed cluster having an assigned encrypted pull secret, wherein the managed cluster is managed by a service provider, the system comprising: a processor arrangement configured to perform the steps of: receiving a pull request from a managed cluster, the pull request having an accompanying encrypted pull secret; determining whether the pull request was initiated by an intended managed cluster by decrypting the encrypted pull secret assigned to the managed cluster using a decryption key; and authorizing the pull request based on whether the decrypted pull secret is assigned to an intended managed cluster.

Thus, there may be proposed concepts for authorizing which pull requests from managed clusters may be fulfilled by the service provider, and this may be done at a centralized data cluster management system. Providing such automated pull request authorization may help to reduce the time taken, and the resources required, to identity a managed cluster that is authorized to submit such a pull request, whilst also improving the security of the pull request authorization process.

BRIEF DESCRIPTION OF THE DRAWINGS

The present disclosure is described in the detailed description which follows, in reference to the noted plurality of drawings by way of non-limiting examples of exemplary embodiments of the present disclosure.

DETAILED DESCRIPTION

Figure 1:
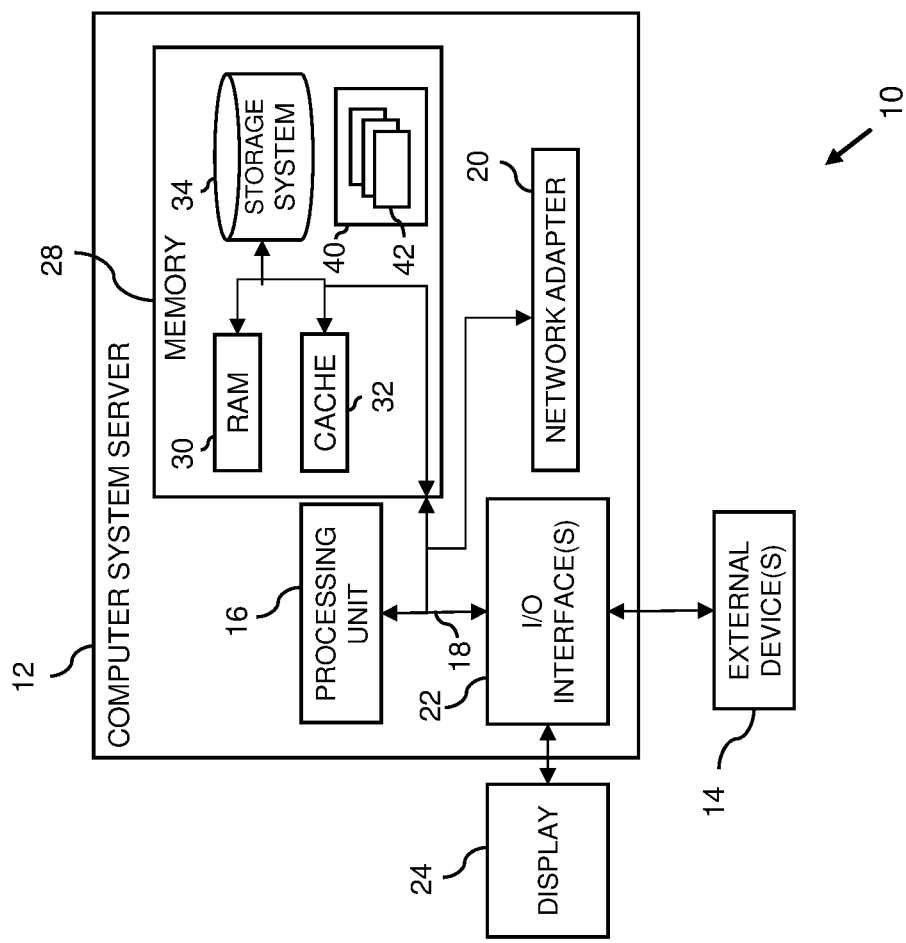
FIG. 1 depicts a cloud computing node according to an embodiment of the present disclosure.

It should be understood that the Figures are merely schematic and are not drawn to scale. It should also be understood that the same reference numerals are used throughout the Figures to indicate the same or similar parts.

In the context of the present application, where embodiments of the present disclosure constitute a method, it should be understood that such a method is a process for execution by a computer, i.e. is a computer-implementable method. The various steps of the method therefore reflect various parts of a computer program, e.g. various parts of one or more algorithms.

Also, in the context of the present application, a (processing) system may be a single device or a collection of distributed devices that are adapted to execute one or more embodiments of the methods of the present disclosure. For instance, a system may be a personal computer (PC), a server or a collection of PCs and/or servers connected via a network such as a local area network, the Internet and so on to cooperatively execute at least one embodiment of the methods of the present disclosure.

Also, in the context of the present application, a system may be a single device or a collection of distributed devices that are adapted to execute one or more embodiments of the methods of the present disclosure. For instance, a system may be a personal computer (PC), a portable computing device (such as a tablet computer, laptop, smartphone, etc.), a set-top box, a server or a collection of PCs and/or servers connected via a network such as a local area network, the Internet and so on to cooperatively execute at least one embodiment of the methods of the present disclosure.

The technical character of the present disclosure generally relates to data cluster management, and more particularly, to data cluster management concepts that may, for example, manage the authorization of a pull request received at a service provider from a managed cluster. More specifically, embodiments of the present disclosure provide concepts for authorizing a pull request from a managed cluster, which is managed by a service provider, the method comprising: for each managed cluster managed by the service provider: generating an encrypted pull secret for a managed cluster; and assigning the generated encrypted pull secret to the managed cluster; and responsive to receiving a pull request from a managed cluster at the service provider, the pull request having an accompanying encrypted pull secret; determining whether the pull request was initiated by an intended managed cluster by decrypting the encrypted pull secret assigned to the managed cluster using a decryption key; and authorizing the pull request based on whether the decrypted pull secret is assigned to an intended managed cluster.

Thus, there may be provided, a concept of authorizing a pull request from a managed cluster by introducing a means of verifying that the pull request was initiated by the original pull secret owner, i.e. the intended managed cluster, and has not been tampered with.

Put another way, the disclosure seeks to provide a means of fine-grained control of access to a registry that verifies that the pull request was initiated by the original pull secret owner and provides a decentralized model for access control by the originator of the pull request.

In some embodiments, determining whether the pull request was initiated by an intended managed cluster comprises retrieving a raw pull secret and a list of one or more approved IP addresses based on the decrypted pull secret. In some instances, a raw pull secret may not have all of the detail for a pull secret, and details, as described herein, may be added to the raw pull secret to compete the pull secret. For example, the raw pull secret may be linked to a unique authorization token.

In an embodiment, determining whether the pull request was initiated by an intended managed cluster comprises extracting a service provider identification tag from the pull request.

In an embodiment, determining whether the pull request was initiated by an intended managed cluster comprises extracting an authorization token from the pull request.

In an embodiment, the pull request is an image pull request.

In an embodiment, determining whether the pull request was initiated by an intended managed cluster comprises extracting, from the pull request, one or more of: an image name; and an image tag.

In an embodiment, the method further comprises: for each managed cluster managed by the service provider: generating a unique authorization token for the managed cluster; and linking the unique authorization token to the pull secret of the managed cluster.

In an embodiment, the method further comprises: for each managed cluster managed by the service provider: responsive to determining that the unique authorization token of a managed cluster has expired, generating a new unique authorization token for the managed cluster; linking the new unique authorization token to the pull secret of the managed cluster.

In an embodiment, the method further comprises: for each managed cluster managed by the service provider: responsive to determining that a parameter of a managed cluster has changed, generating a new unique authorization token for the managed cluster; linking the new unique authorization token to the pull secret of the managed cluster.

In an embodiment, the parameter comprises one or more of: an IP address; and a scope of the managed cluster.

In addition, embodiments of the present disclosure provide concepts for a computer program product for authorizing a pull request from a managed cluster, which is managed by a service provider, the computer program product comprising a computer readable storage medium having program instructions embodied therewith, the program instructions executable by a processing unit to cause the processing unit to perform a method comprising: for each managed cluster managed by the service provider: generating an encrypted pull secret for a managed cluster; and assigning the generated encrypted pull secret to the managed cluster; and responsive to receiving a pull request from a managed cluster at the service provider, the pull request having an accompanying encrypted pull secret; determining whether the pull request was initiated by an intended managed cluster by decrypting the encrypted pull secret assigned to the managed cluster using a decryption key; and authorizing the pull request based on whether the decrypted pull secret is assigned to an intended managed cluster.

In an embodiment, determining whether the pull request was initiated by an intended managed cluster comprises retrieving a raw pull secret and a list of one or more approved IP addresses based on the decrypted pull secret.

In an embodiment, determining whether the pull request was initiated by an intended managed cluster comprises extracting a service provider identification tag from the pull request.

In an embodiment, determining whether the pull request was initiated by an intended managed cluster comprises extracting an authorization token from the pull request.

In an embodiment, the pull request is an image pull request.

In an embodiment, determining whether the pull request was initiated by an intended managed cluster comprises extracting, from the pull request, one or more of: an image name; and an image tag.

In an embodiment, the method further comprises: for each managed cluster managed by the service provider: generating a unique authorization token for the managed cluster; and linking the unique authorization token to the pull secret of the managed cluster.

In an embodiment, the method further comprises: for each managed cluster managed by the service provider: responsive to determining that the unique authorization token of a managed cluster has expired, generating a new unique authorization token for the managed cluster; linking the new unique authorization token to the pull secret of the managed cluster.

In an embodiment, the method further comprises: for each managed cluster managed by the service provider: responsive to determining that a parameter of a managed cluster has changed, generating a new unique authorization token for the managed cluster; linking the new unique authorization token to the pull secret of the managed cluster.

In an embodiment, the parameter comprises one or more of: an IP address; and a scope of the managed cluster.

In addition, embodiments of the present disclosure provide concepts for a processing system comprising at least one processor and the computer program product described above, wherein the at least one processor is adapted to execute the computer program code of said computer program product.

In addition, embodiments of the present disclosure provide concepts for a system for authorizing a pull request from a managed cluster having an assigned encrypted pull secret, wherein the managed cluster is managed by a service provider, the system comprising: a processor arrangement configured to perform the steps of: receiving a pull request from a managed cluster, the pull request having an accompanying encrypted pull secret; determining whether the pull request was initiated by an intended managed cluster by decrypting the encrypted pull secret assigned to the managed cluster using a decryption key; and authorizing the pull request based on whether the decrypted pull secret is assigned to an intended managed cluster.

In an embodiment, determining whether the pull request was initiated by an intended managed cluster comprises retrieving a raw pull secret and a list of one or more approved IP addresses based on the decrypted pull secret.

In an embodiment, the processor arrangement is further configured to perform the steps of: for each managed cluster managed by the service provider: generating a unique authorization token for the managed cluster; and linking the unique authorization token to the pull secret of the managed cluster.

In an embodiment, the processor arrangement is further configured to perform the steps of: for each managed cluster managed by the service provider: responsive to determining that the unique authorization token of a managed cluster has expired, generating a new unique authorization token for the managed cluster; linking the new unique authorization token to the pull secret of the managed cluster; or, for each managed cluster managed by the service provider: responsive to determining that a parameter of a managed cluster has changed, generating a new unique authorization token for the managed cluster; linking the new unique authorization token to the pull secret of the managed cluster.

It is to be understood that although this disclosure includes a detailed description on cloud computing, implementation of the techniques recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify the location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment.

Program modules 42 generally carry out the functions and/or methodologies of embodiments of the disclosure as described herein. For example, some or all of the functions of a DHCP client can be implemented as one or more of the program modules 42. Additionally, the DHCP client may be implemented as separate dedicated processors or a single or several processors to provide the functionality described herein. In embodiments, the DHCP client performs one or more of the processes described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID (redundant array of inexpensive disks or redundant array of independent disks) systems, tape drives, and data archival storage systems, etc.

Figure 2:
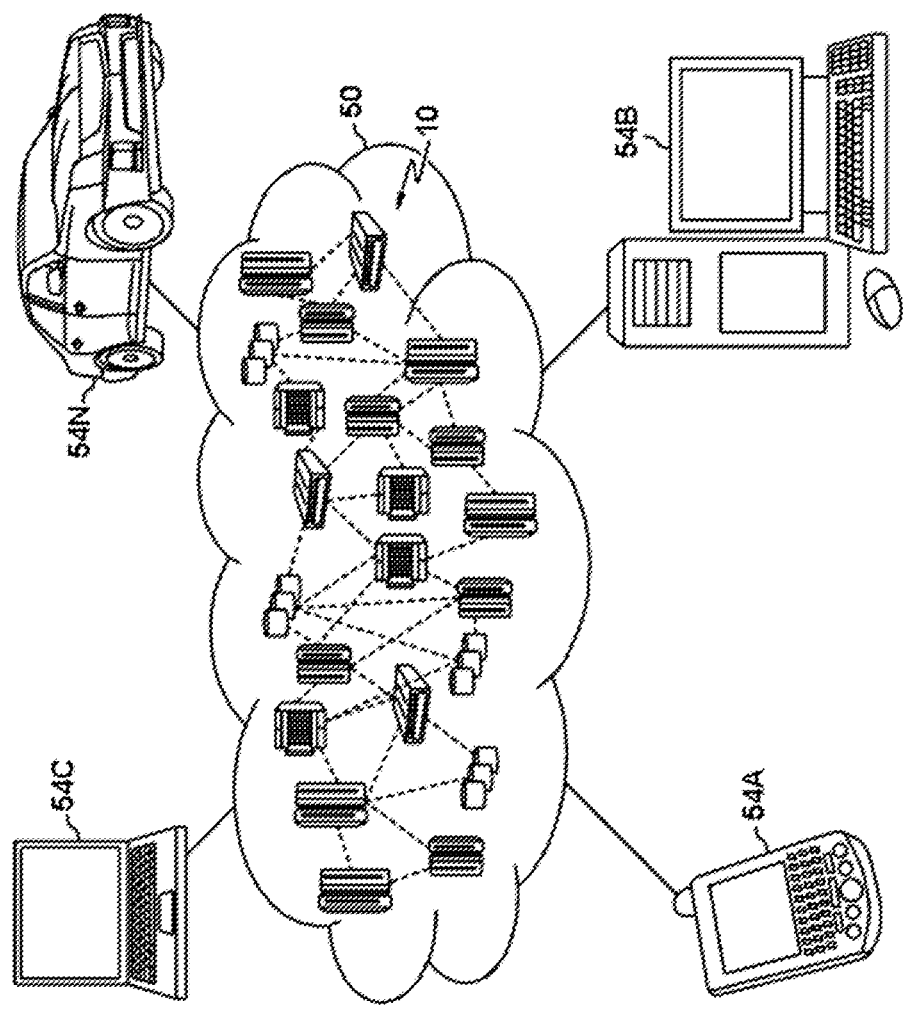
FIG. 2 depicts a cloud computing environment according to embodiments of the present disclosure.

Referring now to FIG. 2, an illustrative cloud computing environment 50 is depicted. As shown, the cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
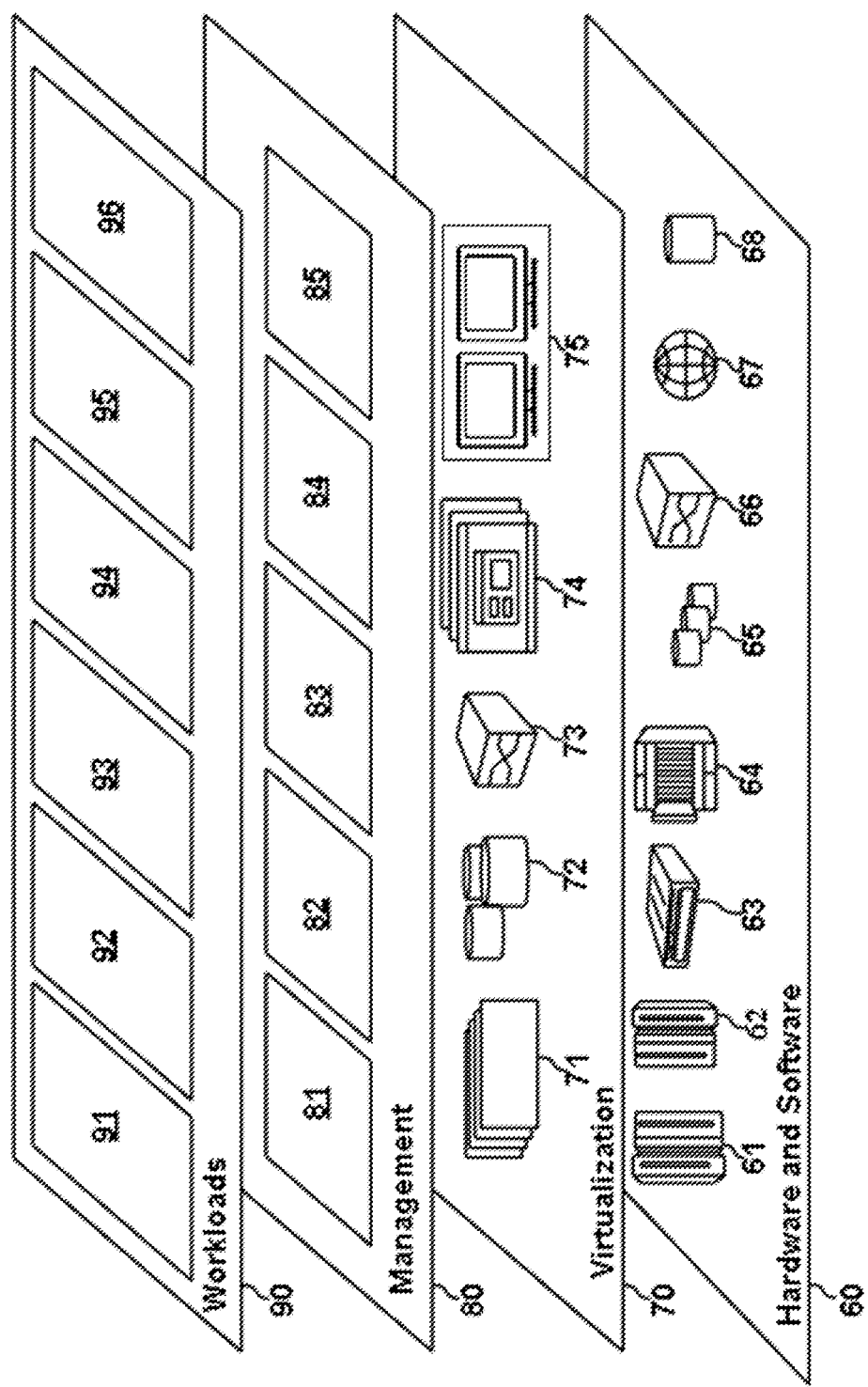
FIG. 3 depicts abstraction model layers according to embodiments of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the disclosure are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage device 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing and data cluster management processes 96 described herein. In accordance with aspects of the disclosure, the data cluster management 96 workload/function operates to perform one or more of the processes described herein.

Figure 4:
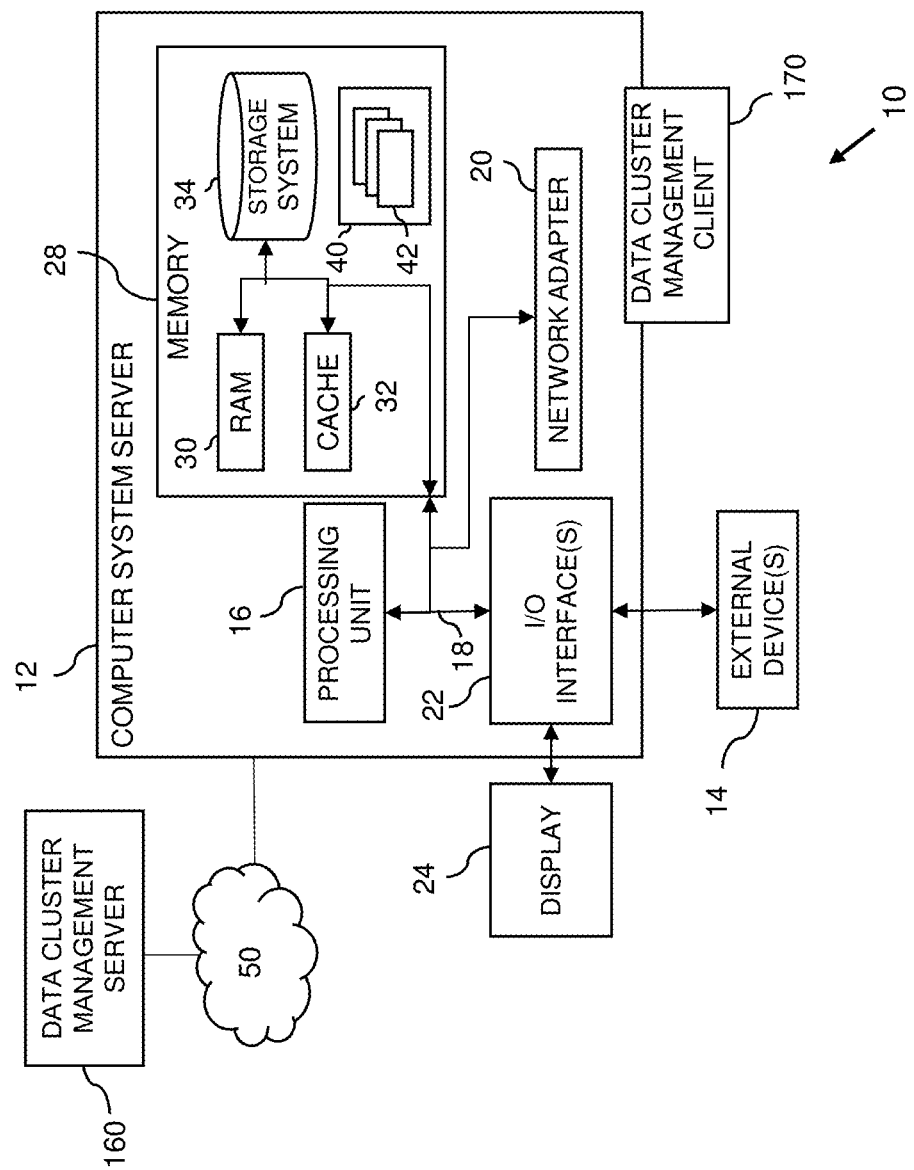
FIG. 4 depicts a cloud computing node according to another embodiment of the present disclosure.

FIG. 4 depicts a cloud computing node according to another embodiment of the present disclosure. In particular, FIG. 4 is another cloud computing node which comprises a same cloud computing node 10 as FIG. 1. In FIG. 4, the computer system/server 12 also comprises or communicates with a data cluster management client 170, and a data cluster management server 160.

In accordance with aspects of the disclosure, the data cluster management client 170 can be implemented as one or more program code in program modules 42 stored in memory as separate or combined modules. Additionally, the data cluster management client 170 may be implemented as separate dedicated processors or a single or several processors to provide the function of these tools. While executing the computer program code, the processing unit 16 can read and/or write data to/from memory, storage system, and/or I/O interface 22. The program code executes the processes of the disclosure.

By way of example, data cluster management client 170 may be configured to communicate with the data cluster management server 160 via a cloud computing environment 50. As discussed with reference to FIG. 2, for example, cloud computing environment 50 may be the Internet, a local area network, a wide area network, and/or a wireless network. In embodiments of the proposed data cluster management mechanism, the data cluster management server 160 may provision data to the client 170. One of ordinary skill in the art would understand that the data cluster management client 170 and data cluster management server 160 may communicate directly. Alternatively, a relay agent may be used as an intermediary to relay messages between data cluster management client 170 and data cluster management server 160 via the cloud computing environment 50.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved.

Figure 5:
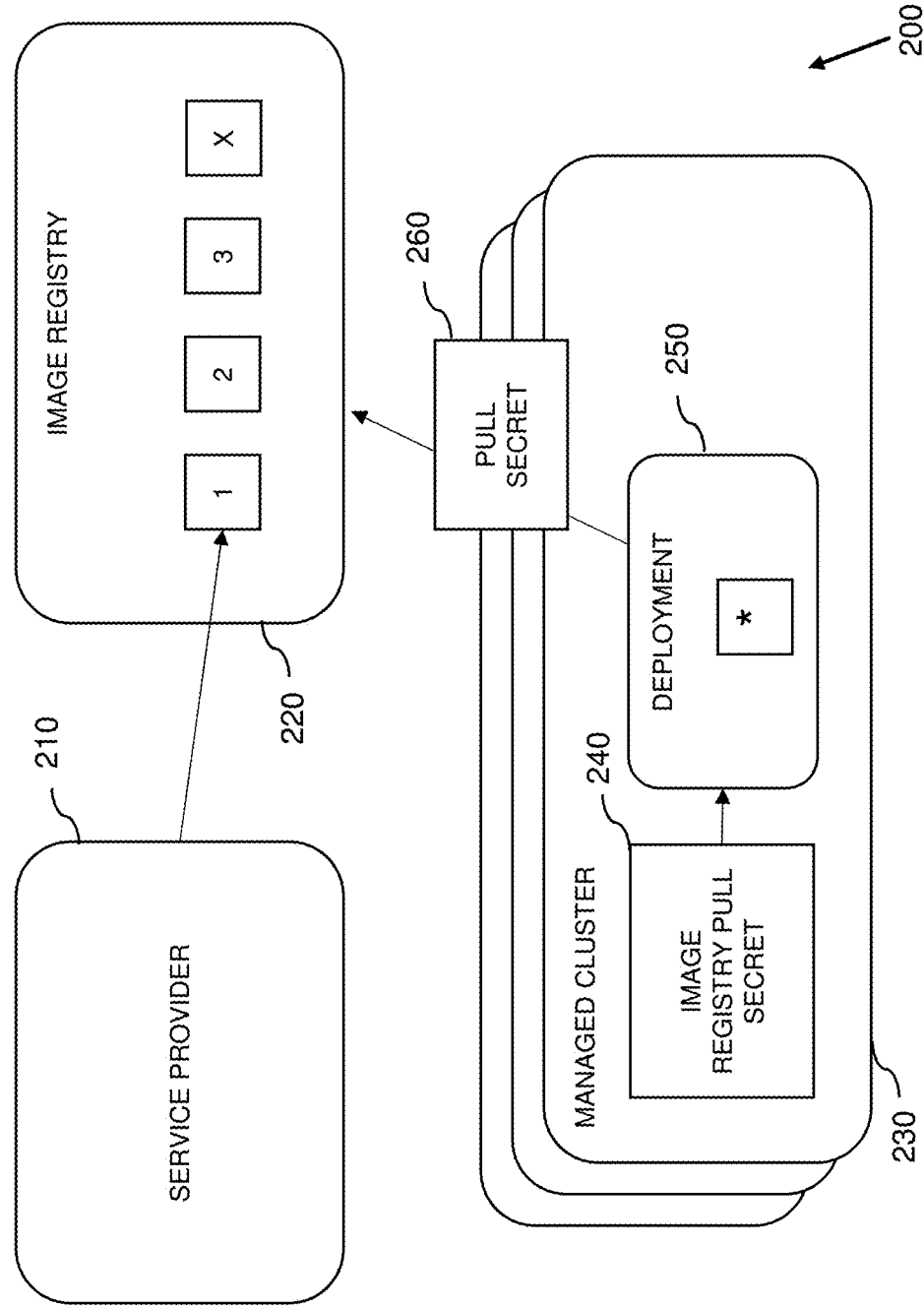
FIG. 5 illustrates an example of an existing data cluster management system 200 according to the prior art.

FIG. 5 illustrates an example of an existing data cluster management system 200 according to the prior art. In the examples described herein, the data cluster management system has been described in the context of pulling images from an image registry managed by a service provider. However, it should be noted that the concepts described herein may be applied to the context of pulling any type of data or resource from a registry managed by a service provider.

The data cluster management system 200 shown in FIG. 5 comprises a service provider 210, an image registry 220 managed by the service provider and one or more managed clusters 230. The service provider is responsible for providing images to the image registry, which may then be pulled by a managed cluster 230 having the image registry pull secret 240.

In the example shown in FIG. 5, the deployment 250 of the image registry pull secret 240 is unrestricted, meaning that the pull secret may be used 260 to access the image registry 220 and pull any of images 1, 2, 3, . . . , X stored on the image registry, even if the service provider had not intended to allow the given managed cluster to access all of the images on the image registry.

Put another way, existing data cluster management systems provide no fine grain control over what aspects of a registry a managed cluster can access and pull once the cluster possesses the pull secret for the registry.

Figure 6:
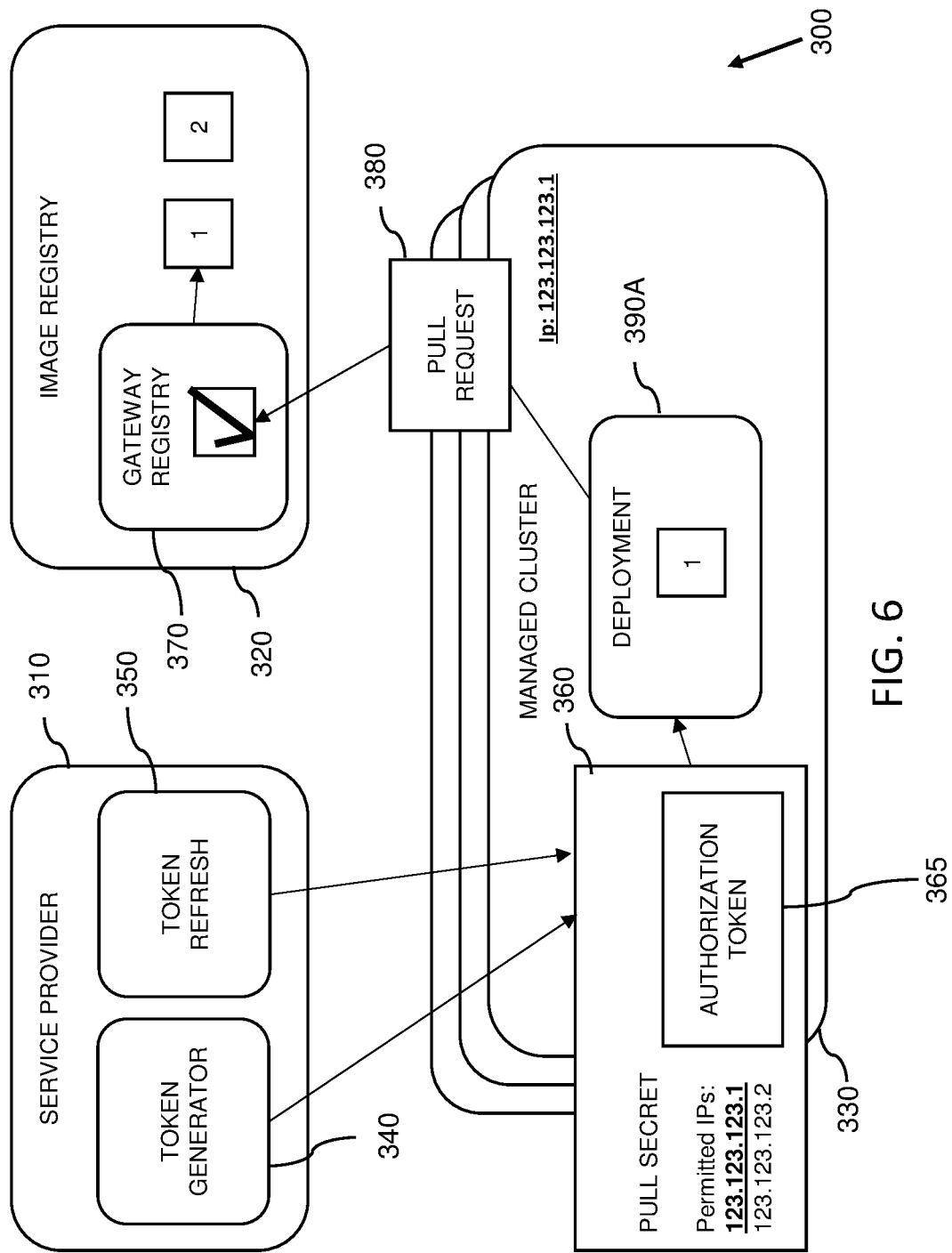
FIG. 6 illustrates a method of authorizing a pull request from a managed cluster according to an aspect of the disclosure.
Figure 7:
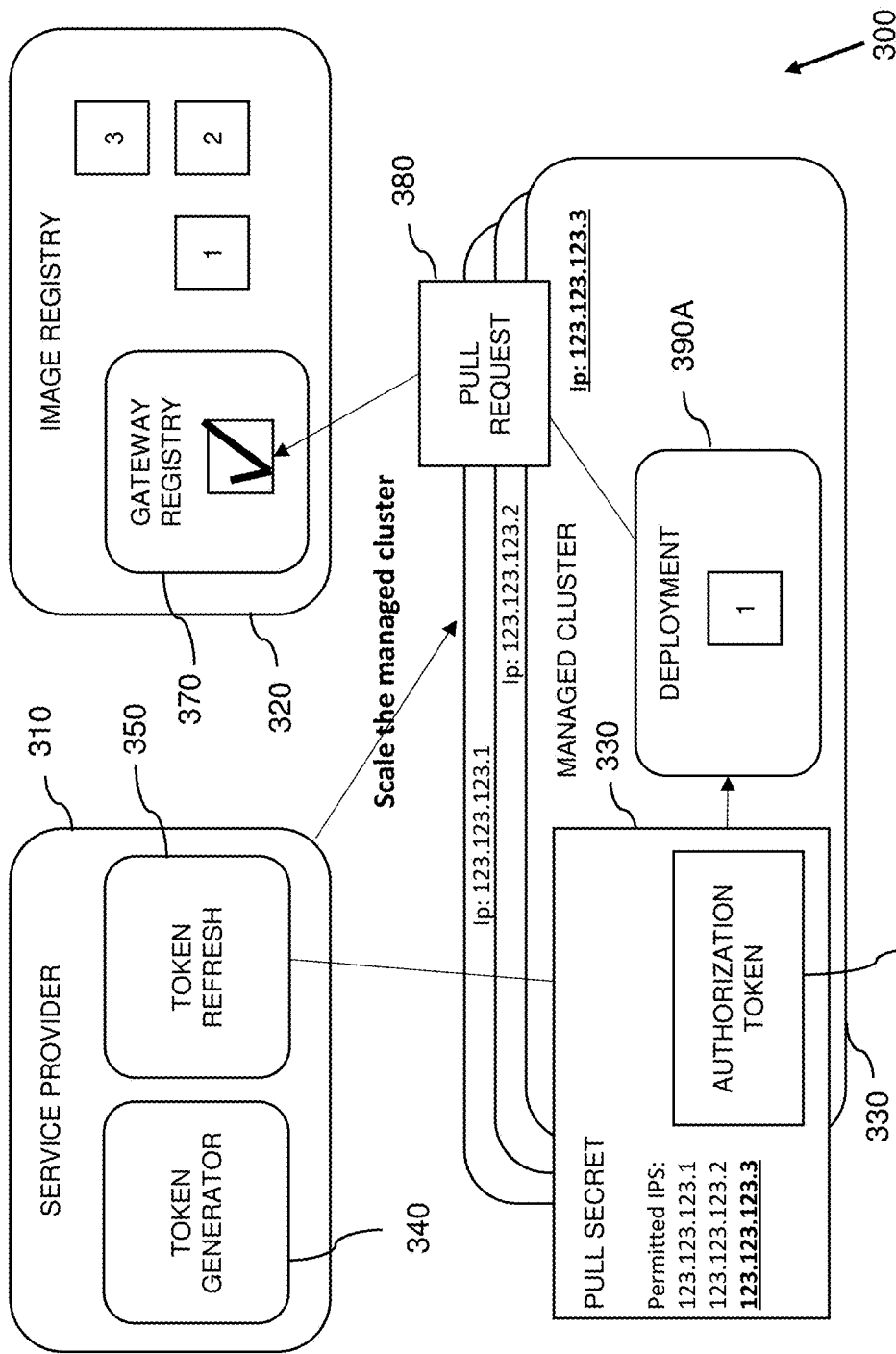
FIG. 7 illustrates a method of authorizing a pull request from a managed cluster according to a further aspect of the disclosure.
Figure 8:
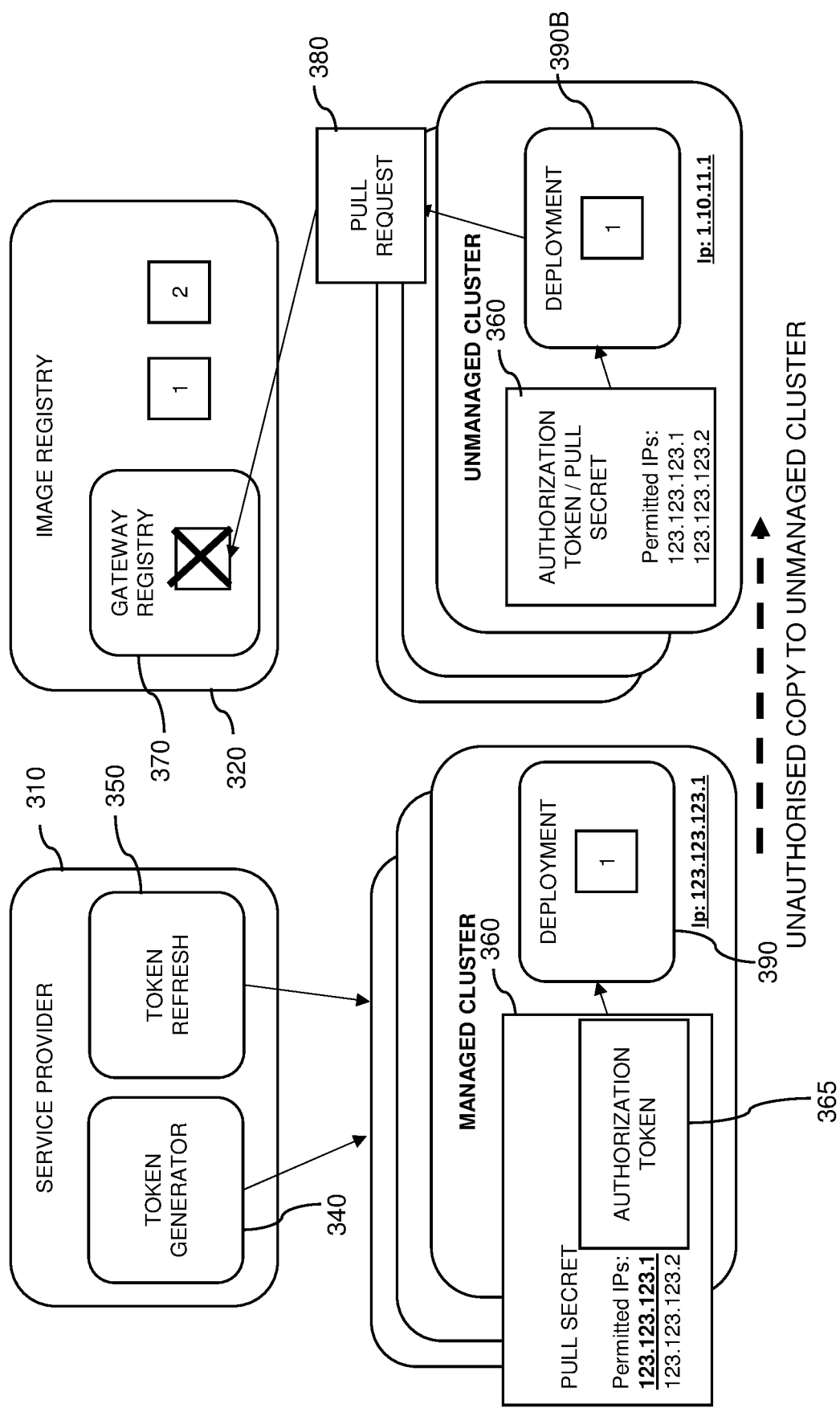
FIG. 8 illustrates a method of authorizing a pull request from a managed cluster according to a further aspect of the disclosure.

FIGS. 6 to 8 illustrate proposed methods of authorizing a pull request from a managed cluster according to an aspect of the disclosure. In the examples shown in FIGS. 6 to 8, the access of the illustrated managed cluster.

FIG. 6 shows a data cluster management system 300 that comprises a service provider 310, an image registry 320 managed by the service provider, and one or more managed clusters 330. The service provider is responsible for providing images to the image registry, which may then be pulled by an authorized managed cluster 330. These components can be implemented as part of a docker registry, or as a gateway registry which controls the traffic into the docker registry.

In the example shown in FIG. 6, the service provider 310 comprises a token generator component 340 and a token refresh component 350. For each managed cluster managed by the service provider, the service provider may be adapted to generate an encrypted authorization token 365 pull secret 360 for a managed cluster and the service provider may then assign the generated encrypted pull secret to the managed cluster. Further, the token generator component may be adapted to, for each managed cluster managed by the service provider, generate a unique authorization token for the managed cluster to be linked with the unique authorization token to the pull secret of the managed cluster. The function of the token refresh component is described in further detail below.

In other words, the token generator may be adapted to generate a unique authorization token for each data plane cluster, or managed cluster, a service provider manages. The generated authorization token may then be linked to access control information, for example to restrict the images that can be pulled using this authorization token and the expiry of the authorization token.

The service provider 310 may store the master pull secret in an additional gateway authorization layer, referred to herein as a gateway registry 370, built into the image registry host to function as a PR authorization check component. A pull secret that allows access to the gateway registry is then given back to the service provider.

When a new managed cluster, such as managed cluster 330, is onboarded, an authorization token 365 pull secret 360 will be generated and associated with authorization information and a short-lived expiry, which may be extended further by the service provider. Each managed cluster may be provided with an authorization token that allows for differential access for different users of the registry in combination with the pull secret.

The service provider 310 may then push the gateway registry 370 layer authorization token 365 pull secret 360, which may contain a service provider identification tag, to a managed cluster 330 owned by a user. When an encrypted pull request 380, such as an image pull request, is received by the gateway registry 370, the gateway registry may decrypt the encrypted pull secret using a decryption key in order to determine whether the pull request was initiated by an intended managed cluster. In the example shown in FIG. 6, the deployment 390A of the pull request to the gateway registry is directed to a request to pull image 1 from the image registry 320.

Upon the decryption of the encrypted pull secret, the gateway registry may parse out one or more of: an authorization token; a service provider identification tag; an image name; and an image tag from the pull request. In addition, the gateway registry may retrieve a raw pull secret and a list of one or more approved/permitted IP addresses to compare to the IP address of the managed cluster that submitted the pull request. The gateway registry may then check with the service provider 310 to ensure the image the pull request is pulling, which is image 1 in the example shown in FIG. 6, is authorized by the service provider, before proceeding as with a normal transaction. In the example of FIG. 6, the gateway registry approves the request because the cluster IP address is in the list of permitted IPs within the pull secret.

The pull request 380 may then be authorized based on whether the decrypted pull secret, and in particular the information parsed from the pull request, is assigned to an intended managed cluster 330 known to the service provider 310.

FIG. 7 shows the data cluster management system of FIG. 6 when the service provider 310 scales the cluster and reissues a pull secret that contains the added/removed updated IP addresses.

When new access permissions are required by the managed cluster 330, for example for adding new IP addresses that were not included in the initial pull secret or authorization token provided to the managed cluster, a new authorization token will need to be issued to the managed cluster. This action may be performed by the token refresh component 350. The token refresh component may be used to issue new authorization tokens to the data plane clusters it manages, for example when a user purchases a new plan from the service provider which enables/removes functionalities.

Accordingly, responsive to determining that the unique authorization token of a managed cluster 330 has expired or needs updating, a new unique authorization token may be generated for the managed cluster and linked to the pull secret of the managed cluster. Further, responsive to determining that a parameter, such as an IP address a scope of the managed cluster has changed, a new unique authorization token may also be generated for the managed cluster and linked to the pull secret of the managed cluster.

As can be seen from the example shown in FIG. 7, when the managed cluster 330 deploys 390A the updated (i.e. re-issued) pull secret and authorization token to pull image 3 from the image registry, the gateway registry authorizes the pull request.

In the examples described with respect to FIGS. 6 and 7, the managed cluster 330 has been provided with a pull secret and authorization token combination to permit the managed cluster to pull image 1 or image 1 and 3, respectively. FIG. 8 illustrates an example of when an unmanaged cluster submits a pull request for image 2, which is not included in the authorization token 360. When the pull request 380 for image 2 is deployed 390B, the gateway registry decrypts the pull request and parses out the information as described above. In the example shown in FIG. 8, the parsed information would reveal that the managed cluster does not have permission to pull image 2 from the image registry. For instance, FIG. 8 shows an example where there is an unauthorized copy to an unmanaged cluster.

Accordingly, the gateway registry 370 rejects the pull request 380 for image 2 from the managed cluster, because the cluster IP address ("1.10.11.1") is not included in the permitted IPs list in the pull secret.

In contrast to existing data cluster management systems, the methods and systems of the disclosure provide a managed service in which a service provider no longer needs to constantly enable or disable new and old managed clusters or manage and update an access right list in a central registry.

The examples described above illustrate a data cluster management system that does not require the image registry to read or store client node information as the information required for access check is embedded in the encrypted pull request.

It should now be understood by those of skill in the art, in embodiments of the present disclosure, the proposed concepts provide numerous advantages over conventional data cluster management approaches. These advantages include, but are not limited to, efficient and accurate approval of a pull request received from a managed cluster at a service provider.

In still further advantages to a technical problem, the systems and processes described herein provide a computer-implemented method for efficient data cluster management on a distributed communication network. In this case, a computer infrastructure, such as the computer system shown in FIGS. 1 and 4 or the cloud environment shown in FIG. 2 can be provided and one or more systems for performing the processes of the disclosure can be obtained (e.g., created, purchased, used, modified, etc.) and deployed to the computer infrastructure. To this extent, the deployment of a system can comprise one or more of:

(i) installing program code on a computing device, such as computer system shown in FIG. 1, from a computer-readable medium;

(ii) adding one or more computing devices to the computer infrastructure and more specifically the cloud environment; and (iii) incorporating and/or modifying one or more existing systems of the computer infrastructure to enable the computer infrastructure to perform the processes of the disclosure.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer implemented method for authorizing a pull request from a managed cluster, which is managed by a service provider, the computer implemented method comprising:

for each managed cluster managed by the service provider:

generating an encrypted pull secret for a managed cluster that comprises a plurality of nodes, wherein the pull secret includes respective IP addresses of the plurality of nodes;

generating a unique authorization token for the managed cluster;

linking the unique authorization token to the pull secret;

assigning the generated encrypted pull secret to the managed cluster;

determining, responsive to receiving a pull request from a managed cluster at the service provider where the pull request has an accompanying encrypted pull secret, that the pull request was initiated by an intended managed cluster by decrypting the encrypted pull secret assigned to the managed cluster using a decryption key by determining the respective IP addresses are in a list of approved IP addresses; and authorizing the pull request based on whether the decrypted pull secret is assigned to an intended managed cluster;

responsive to determining that the unique authorization token has expired, generating a new unique authorization token; and linking the new unique authorization token to the pull secret.

2. The computer implemented method as claimed in claim 1, wherein determining whether the pull request was initiated by an intended managed cluster comprises retrieving a raw pull secret and a list of one or more approved IP addresses based on the decrypted pull secret.

3. The computer implemented method as claimed in claim 1, wherein determining whether the pull request was initiated by an intended managed cluster comprises extracting a service provider identification tag from the pull request.

4. The computer implemented method as claimed in claim 1, wherein determining whether the pull request was initiated by an intended managed cluster comprises extracting an authorization token from the pull request.

5. The computer implemented method as claimed in claim 1, wherein the pull request is an image pull request.

6. The computer implemented method as claimed in claim 5, wherein determining whether the pull request was initiated by an intended managed cluster comprises extracting, from the pull request, information selected from the group consisting of:

an image name; and an image tag.

7. The computer implemented method as claimed in claim 1, wherein the method further comprises:

for each managed cluster managed by the service provider:

generating a unique authorization token for the managed cluster; and linking the unique authorization token to the pull secret of the managed cluster.

8. The computer implemented method as claimed in claim 7, wherein the method further comprises:

for each managed cluster managed by the service provider:

responsive to determining that a parameter of a managed cluster has changed, generating a new unique authorization token for the managed cluster; and linking the new unique authorization token to the pull secret of the managed cluster.

9. The computer implemented method as claimed in claim 8, wherein the parameter is selected from the group consisting of:
- an IP address; and
- a scope of the managed cluster.

10. A computer program product for authorizing a pull request from a managed cluster, which is managed by a service provider, the computer program product comprising a computer readable storage medium having program instructions embodied therewith, the program instructions executable by a processing unit to cause the processing unit to perform a method comprising:
- for each managed cluster managed by the service provider:
  - generating an encrypted pull secret for a managed cluster that comprises a plurality of nodes, wherein the pull secret includes respective IP addresses of the plurality of nodes;
  - generating a unique authorization token for the managed cluster;
  - linking the unique authorization token to the pull secret;
  - assigning the generated encrypted pull secret to the managed cluster;
  - determining, responsive to receiving a pull request from a managed cluster at the service provider, the pull request having an accompanying encrypted pull secret, that the pull request was initiated by an intended managed cluster by decrypting the encrypted pull secret assigned to the managed cluster using a decryption key by determining the respective IP addresses are in a list of approved IP addresses;
  - authorizing the pull request based on whether the decrypted pull secret is assigned to an intended managed cluster,
  - responsive to determining that the unique authorization token has expired, generating a new unique authorization token; and
  - linking the new unique authorization token to the pull secret.

11. The computer program product as claimed in claim 10, wherein determining whether the pull request was initiated by an intended managed cluster comprises retrieving a raw pull secret and a list of one or more approved IP addresses based on the decrypted pull secret.

12. The computer program product as claimed in claim 10, wherein the method further comprises:
- for each managed cluster managed by the service provider:
  - generating a unique authorization token for the managed cluster; and
  - linking the unique authorization token to the pull secret of the managed cluster.

13. The computer program product as claimed in claim 12, wherein the method further comprises:
- for each managed cluster managed by the service provider:
  - responsive to determining that the unique authorization token of a managed cluster has expired, generating a new unique authorization token for the managed cluster; and
  - linking the new unique authorization token to the pull secret of the managed cluster.

14. A system for authorizing a pull request from a managed cluster having an assigned encrypted pull secret, wherein the managed cluster is managed by a service provider, the system comprising:
- a processor arrangement configured to perform the steps of:
  - receiving a pull request from a managed cluster that comprises a plurality of nodes, the pull request having an accompanying encrypted pull secret, wherein the pull secret includes respective IP addresses of the plurality of nodes;
  - generating a unique authorization token for the managed cluster;
  - linking the unique authorization token to the pull secret;
  - determining that the pull request was initiated by an intended managed cluster by decrypting the encrypted pull secret assigned to the managed cluster using a decryption key by determining the respective IP addresses are in a list of approved IP addresses; &
  - authorizing the pull request based on whether the decrypted pull secret is assigned to an intended managed cluster;
  - responsive to determining that the unique authorization token has expired, generating a new unique authorization token; and
  - linking the new unique authorization token to the pull secret.

15. The system as claimed in claim 14, wherein determining whether the pull request was initiated by an intended managed cluster comprises retrieving a raw pull secret and a list of one or more approved IP addresses based on the decrypted pull secret.

16. The system as claimed in claim 14, wherein the processor arrangement is further configured to perform the steps of:
- for each managed cluster managed by the service provider:
  - responsive to determining that the unique authorization token of a managed cluster has expired, generating a new unique authorization token for the managed cluster;
  - linking the new unique authorization token to the pull secret of the managed cluster; and,
- for each managed cluster managed by the service provider:
  - responsive to determining that a parameter of a managed cluster has changed, generating a new unique authorization token for the managed cluster; and
  - linking the new unique authorization token to the pull secret of the managed cluster.

* * * * *